United States Patent [19]

Shelby

[11] Patent Number: 4,944,385
[45] Date of Patent: Jul. 31, 1990

[54] ENDLESS BELT MOISTURE CONTROL APPARATUS

[76] Inventor: Barry G. Shelby, 410 N. College St., Greenville, Ky. 42345

[21] Appl. No.: 357,692

[22] Filed: May 25, 1989

Related U.S. Application Data

[63] Continuation of Ser. No. 244,156, Sep. 14, 1988, abandoned.

[51] Int. Cl.$^5$ .............................................. B65G 45/00
[52] U.S. Cl. ...................................... 198/495; 198/500
[58] Field of Search .................... 198/493, 494, 500; 73/73

[56] References Cited

U.S. PATENT DOCUMENTS

| | | | |
|---|---|---|---|
| 2,812,976 | 11/1957 | Hasenkamp | 299/27 |
| 3,713,966 | 1/1973 | Lippke | 162/263 |
| 3,731,520 | 5/1973 | Hickman et al. | 73/73 |
| 3,823,371 | 7/1974 | Lippke | 162/263 |
| 3,874,590 | 4/1975 | Gibson | 239/63 |
| 4,055,077 | 10/1977 | Loch | 73/73 |
| 4,095,458 | 6/1978 | Wild | 73/73 |
| 4,186,592 | 2/1980 | Eirich et al. | 73/73 |
| 4,427,976 | 1/1984 | Lord | 340/604 |

Primary Examiner—Robert J. Spar
Assistant Examiner—D. Glenn Dayoan
Attorney, Agent, or Firm—Senniger, Powers, Leavitt and Roedel

[57] ABSTRACT

An apparatus for controlling the moisture content of an endless moving belt. A conductor for electrically conducting a signal abuts a roller that provides electrical contact between the conductor and the belt. The roller is rotatable with respect to the conductor and supports the belt as it moves. A circuit connected to the conductor monitors the belt resistance and indicates when the belt resistance is above a preset maximum thereby indicating that the moisture content of the belt has fallen below a predetermined minimum. A spray system responsive to the circuit sprays the belt with water and increases the moisture level of the belt as long as the moisture level is below the predetermined minimum.

19 Claims, 2 Drawing Sheets

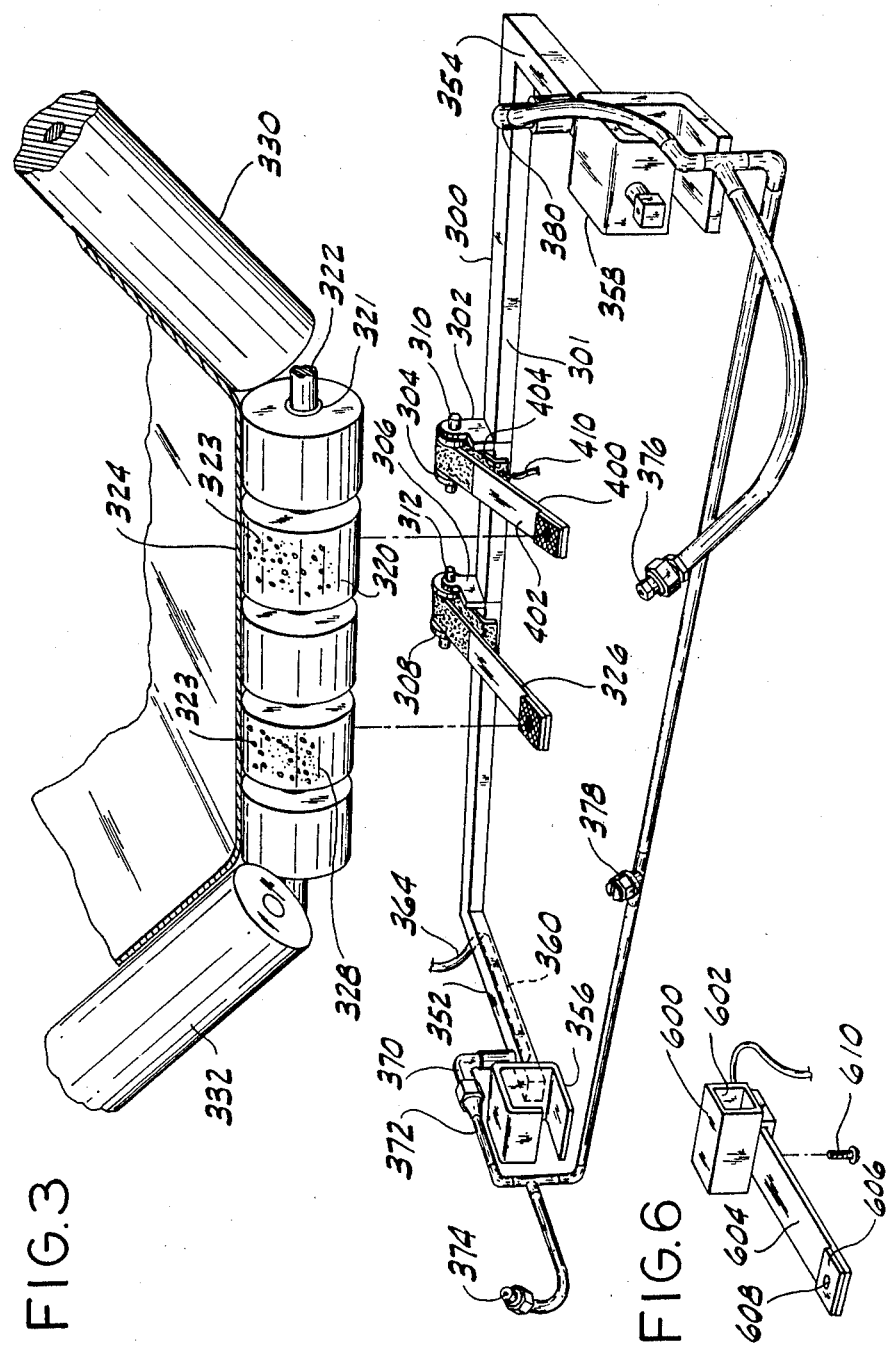

ENDLESS BELT MOISTURE CONTROL APPARATUS

This is a continuation of co-pending application Ser. No. 07/244,156 filed on Sept. 14, 1988, now abandoned.

BACKGROUND OF THE INVENTION

The present invention relates to an apparatus for controlling the moisture content of an endless belt. In particular, the invention relates to an apparatus for spraying water on an endless, moving belt when the moisture level of the belt falls below a preset minimum.

Carrying coal by a conveyor belt results frequently in the creation of dust. To reduce the amount of dust in the air, it is common for the belt to be sprayed so that the moisture in the belt will absorb dust. The belt is also sprayed to maintain flexibility and reduce brittleness of the belt which may cause excessive wear of the belt. The conveyor belt spray systems heretofore known have caused wear to the belt by abutting a stationary conductor directly against the moving belt to electrically measure its moisture content. Such direct contact between the belt and the conductor causes a path to be worn on the belt.

SUMMARY OF THE INVENTION

Among the several objects of this invention is the provision of controlling the moisture content of an endless moving belt, especially a belt as used for the transport of coal.

It is another object of the present invention to control the moisture content of an endless, moving belt without causing undue wear to the belt.

It is a further object of the invention to provide a system for spraying a belt with water when the resistance of the belt is above a preset maximum indicating that the moisture content of the belt is below a level corresponding to the preset maximum resistance.

The apparatus of the invention controls the moisture content of an endless, moving belt. Means electrically conducts a signal. Means provides electrical contact between the means for conducting and the belt, the means for providing being rotatable relative to the means for conducting and adapted to support the belt as it moves. Means connected to the conducting means indicates when the moisture content falls below a predetermined minimum. Means responsive to the indicating means increases the moisture level of the belt when the moisture level falls below the predetermined minimum.

Other objects and features will be in part apparent and in part pointed out hereinafter.

BRIEF DESCRIPTION OF THE DRAWINGS

FIG. 3 shows a perspective view of conductors and spray system of an apparatus according to the invention;

FIG. 6 shows a perspective view of another embodiment of a low-profile conductor for use as part of the invention.

Corresponding reference characters indicate corresponding parts throughout the several veiws of the drawings.

DETAILED DESCRIPTION OF PREFERRED EMBODIMENTS

The moisture content of an endless, moving conveyor belt should be controlled and maintained above a preset minimum to avoid undue dryness of the belt which causes the belt to become brittle resulting in excessive wear of the belt and which limits the absorption of dust by the belt. Belts are usually made of an insulating material, such as rubber, and are non-conductive. Moisture acts as a conductor so that the more moisture in a belt, the lower the resistance of the belt. Therefore, the resistance of the belt is an inverse function of its moisture content. A predetermined minimum moisture content of the belt corresponds to a maximum acceptable resistance of the belt. By detecting the belt's resistance and comparing it to a value corresponding to the maximum acceptable resistance of the belt, the belt's moisture content can be monitored. When the resistance of the belt is greater than the maximum acceptable resistance, a spray system is activated to spray the belt with water until the belt resistance falls below the maximum acceptable resistance.

Figure 1:
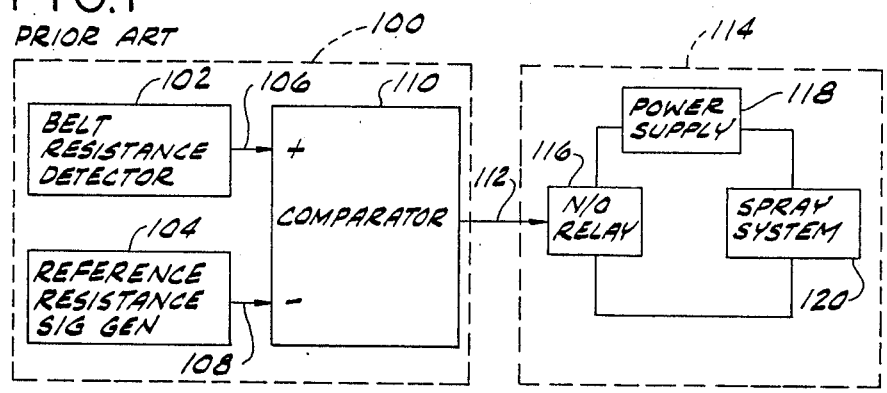
FIG. 1 shows a block diagram of a prior art apparatus.

Referring now to FIG. 1, which illustrates the prior art, belt resistance detector 102 is a device or circuit which measures the resistance of the belt and provides an output signal via line 106 having a parameter, such as voltage magnitude, representative of the measured resistance. Reference resistance signal generator 104 is a circuit which produces a reference signal via line 108 having a corresponding parameter representative of the maximum acceptable resistance. The output signal of detector 102 and the reference signal of generator 104 are provided to inputs of comparator 110 via lines 106 and 108, respectively. Comparator 110 compares the parameters of these signals and produces an enabling signal via line 112 whenever the parameter of the output signal of detector 102 is greater than the corresponding parameter of the signal provided by signal generator 104. The combination of detector 102, generator 104 and comparator 110 constitutes means 100 for indicating when the moisture content of the belt falls below the predetermined minimum.

A normally open relay 116, responsive to the enabling signal, is connected in series with a power supply 118 and a spray system 120 When the relaY 116 receives the enabling signal the relay will close, completing a circuit between power supply 118 and spray system 120 and supplying power to turn on the spray system 120. Power supply 118, relay 116 and the spray system 120 combine to form means 114 for increasing the moisture level of a belt when the moisture level falls below a predetermined minimum.

In operation of one embodiment of the prior art, detector 102 monitors the resistance of the belt providing an output signal having a voltage magnitude representative thereof via line 106. Comparator 110 compares the output voltage to a voltage reference signal generated by reference resistance signal generator 104 via line 108. When the output voltage is greater than the reference voltage, comparator 110 provides an enabling signal via line 112 closing relay 116 to energize spray system 120 by power supply 118 as long as the output voltage is greater than the reference voltage.

Figure 2:
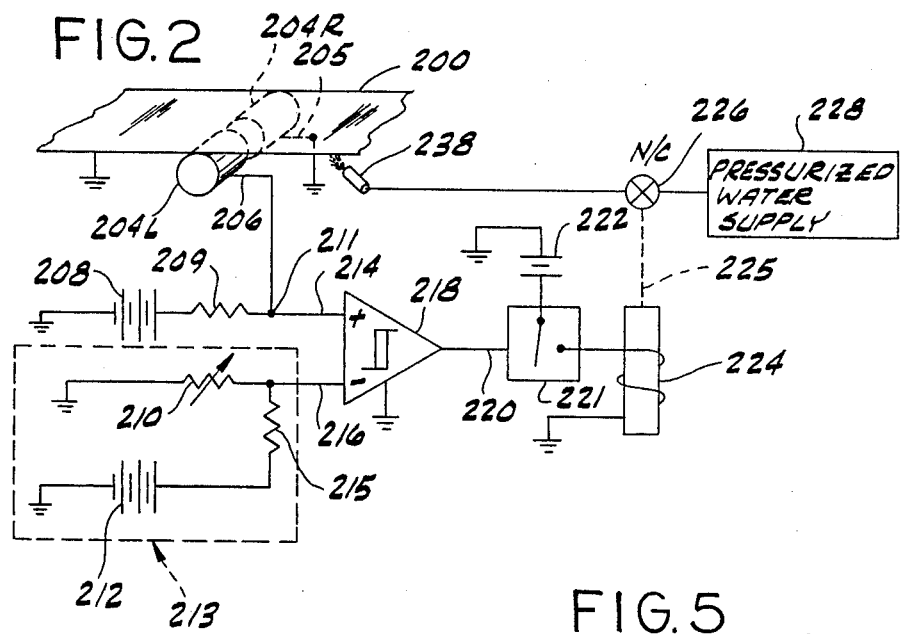
FIG. 2 shows a circuit diagram of the invention.

A circuit diagram of the present invention is shown in FIG. 2. A left ceramic (or metallic) roller 204L, or other rotatable conductive element adapted to support a grounded belt 200, is located between and in electrical contact with conductor 206, and grounded belt 200. Alternatively, the belt 200 may be grounded by contacting a second conductor 205 with a right roller 204R and connecting the conductor 205 to ground. The amount of moisture on the belt determines the conductivity of the roller because the moisture collects on the surface of the roller and creates a conductive layer thereon. Wear to the belt 200 caused by contacting the belt directly with the conductor 206 is thus avoided, yet the conductor 206 is maintained in electrical contact with the belt 200. The conductor 206 may be a spring steel member with a carbide contact tip and is urged against the roller 204L and is electrically connected to a grounded power supply 208 such as a 9 volt supply. Current flows from battery 208, through resistor 209 to conductor 206 and along the surface of roller 204L and through belt 200 which has a resistance which is an inverse function of its moisture content. The moisture level on the surface of the ceramic roller is the same as the moisture level on the belt due to their physical contact. The voltage drop at point 211 equals the currents flowing through resistor 209 multiplied by the resistance of the belt. Accordingly, the voltage applied via a line 214 to a comparator 218 represents the resistance of belt 200. In the case of a metallic roller, the current flows through it so that it must be electrically isolated from ground. Metallic rollers are generally not preferred. Metallic or other conductive rollers must be maintained clean and free of mud or other deposits which could cause shorting.

The voltage comparator 218 has inverting and noninverting inputs and an output which goes low whenever the voltage applied to its inverting input has a magnitude which is greater than the voltage applied to the noninverting input. The inverting input of the comparator 218 is connected via a line 216 to a circuit 213 which produces a reference voltage having a preset magnitude. As grounded power supply 212 is electrically connected through resistor 215 to a grounded variable resistor 210. Current flows from battery 212, through resistor 215 and through variable resistor 210. Preferably, the resistance of resistor 215 equals the resistance of resistor 209. In this way, resistor 210 may be set at the magnitude of the total of the resistance of belt 200 and the resistance of roller 204L which corresponds to the minimum acceptable moisture content of the belt. The voltage signal applied via line 216 to comparator 218 represents the maximum acceptable resistance.

The conductor 206 constitutes means for electrically conducting a signal and the roller 204L constitutes means for providing electrical contact between the means for conducting and the belt, the means for providing being rotatable with respect to the means for conducting and the belt 200. The comparator 218 constitutes means for comparing a magnitude of the resistance signal provided via line 214 to a magnitude of a preset reference signal provided via line 216 and providing an activating signal via a line 220 when the resistance signal is greater than the reference signal. The combination of the comparator 218, the variable resistance 210 and the power supplies 208 and 212 constitute means connected to the conductor for indicating when the moisture content falls below a predetermined minimum.

When the voltage at point 211 is greater than the voltage applied to line 216, comparator 218 provides activating signal via line 220 to a switch 221. A solenoid 224 controls a normally closed valve 226 and is activated by a power source 222 when switch 221 is closed by the activating signal to move a core 225 centrally located within the solenoid. The core 225 is mechanically connected to valve 226. When the output of comparator 218 goes high, switch 221 is closed to activate solenoid 224 and core 225 is moved with respect to the solenoid 224 to open valve 226. The valve 226, being connected to a pressurized water supply 228, is opened to permit a nozzle configuration 238 connected to the water supply to spray the belt 200 with water. The solenoid 224, the valve 226, the water supply 228 and the nozzle configuration 238 combined constitute means responsive to the indicating means for increasing the moisture level of the belt when the moisture level falls below the predetermined minimum.

In operation of one embodiment of the invention, the resistance of the grounded belt 200 is detected by placing a voltage across the belt. As the resistance increases the potential between belt 200 and ground increases and this potential is applied to the noninverting input of comparator 218. A potential difference is applied to the inverting input of the comparator 218 that corresponds to the potential across reference variable resistor 210. The variable resistor 210 is set to the maximum resistance desired in the belt 200, that is to say the minimum moisture level acceptable. A voltage is applied across variable resistor 210 and this potential is applied to the inverting input of comparator 218. Then when the resistance signal from the belt 200 becomes greater than the reference signal the comparator 218 generates an enabling signal. The enabling signal is transmitted to relay 221. The relay 221 is normally open so that when the enabling signal is received the relay 221 closes, completing a circuit of power supply 222 and solenoid 224. Valve 226 will then be opened and pressurized water supply 228 will spray the belt until the resistance drops below the reference resistance when a disabling signal is sent to the relay 221 by the comparator 218.

Figure 4:
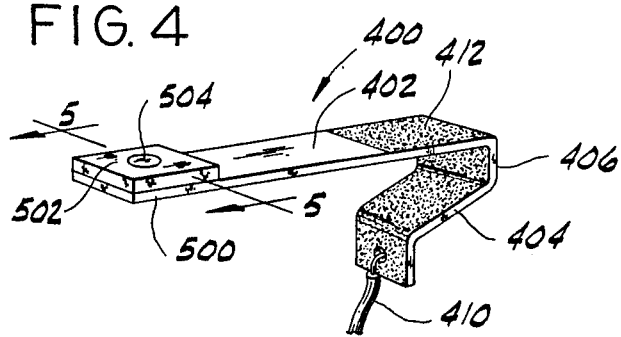
FIG. 4 shows a perspective view of one embodiment of a conductor for use as part of the invention.

Referring to FIGS. 3 and 4, a horizontal bar 300 supports lateral, vertical tabs 302, 304, 306 and 308 which are perpendicular to bar 300 and welded thereto. Tabs 302 and 304 have coaxial bores for suPporting a horizontal pin 310 located coaxially within the bores. Similarly, tabs 306 and 308 have coaxial bores for supporting a horizontal pin 312 coaxially therein.

Conductor 400 comprises a resilient conductive material such as aluminum or spring steel in a generally U-shape having a first leg 402 and a second leg 404 integrally joined by a base 406. The free end of leg 404 projects laterally outward away from leg 402 and substantially perpendicular to leg 404 to abut against a surface 301 of horizontal bar 300. Pin 310 is located within the U-shaped conductor 400 between legs 402 and 404. Conductor 400 is substantially rigid so that leg 404 is biased toward leg 402 by the surface 301 of horizontal bar 300, which functions as a stationary member, to urge the free end of leg 402 upward into engagement and electrical contact with a roller 320. Roller 320 is vertically supported for rotation about a horizontal axle 322 and supports an endless belt 324. Roller 320 is in electrical contact with belt 324. If a roller is made of conductive material, such as metal, it should be electrically insulated from axle 322 by non-conductive bushings 321 between it and the axle. In addition, conductive rollers should also be insulated from each other such as by non-conductive washers (not shown) located between adjacent rollers. If a roller is made of a non-conductive material, such as ceramic, it need not be electrically insulated because only the layer of moisture 323 carried on its surface is conductive. This layer of moisture 323 on the surface of the roller is a function of the moisture level of the belt. Conductor 400 is electrically connected to point 211 (FIG. 2) via a conductor 410 in contact with the free end of leg 404. Leg 404, base 406 and the portion of leg 402 not in contact with roller 320 is covered by an insulated coating 412, such as a non-conductive synthetic resin, to prevent electrical contact between conductor 400 and the support structure comprised of pin 310, tabs 302, 304 and bar 300; therefore, conductor 400 is electrically isolated from this support structure. When belt 324 is grounded, the electrical current path is from conductor 400, along the surface of isolated roller 320, and through belt 324 to ground.

Conductor 326 is an optional ground and has the same structure as conductor 400 and is urged into electrical contact with a roller 328 which is also supported for vertical rotation by horizontal axle 322. Conductor 326 may be grounded as shown in FIG. 2. Roller 328 also supports endless belt 324 and is in electrical contact therewith. Diagonal support rollers 330 and 332 may also be provided to support the edges of belt 324. Additional rollers may be located between rollers 320 and 328 for providing additional support of the central portion of belt 324. When both conductors 400 and 326 are used, the electrical current path is from conductor 400, through isolated roller 320, through belt 324 and through isolated roller 328 to conductor 326.

The ends of horizontal bar 300 terminate in end members 352 and 354 which terminate in C-clamps 356, 358, respectively, for engaging other support structure of the endless belt 324. End member 352 is hollow and encloses supply tubing 360 which is connected via valve 226 (FIG. 2) to a pressurized water supply by a hose 364. The other end of supply tube 360 is connected to a right angle fitting 370 which is connected to tubing 372 which, in turn, is connected to conical sprayers 374 and 376 and fan sprayer 378. Tubing 372 terminates in a right angle fitting 380 which engages end member 354 to support the tubing.

Figure 5:
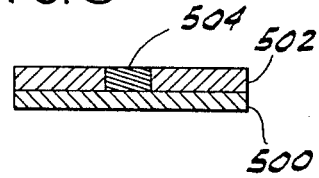
FIG. 5 shows a cross sectional view of a detail of FIG. 4 taken along line 5—5.

Referring now to FIGS. 4 and 5, tungsten carbide pad 502 is attached to the free end of the first leg 400 for contact with the roller which contacts and supports the belt. Pad 502 inhibits wear of the conductor and the roller which results from the relative sliding movement between the pad and the roller as the roller rotates. In the center of the pad 502 is a cylindrical contact tip 504, which establishes electrical contact between the roller and conductor 410 which is connected to circuitry as illustrated in FIG. 2. The portion of conductor 400 which contacts the support tabs, pivot pin and horizontal bar is covered with an electrically insulative coating 412 to prevent electrical contact between the conductor 400 and the tab, pin and/or bar.

Alternatively, a low-profile conductor such as illustrated in FIG. 6 may be employed. A base 600 defining a rectangular bore 602 for receiving horizontal bar 300 supports a flat conductor 604 having a pad 606 with contact tip 608 urged upward for contact to a roller. Screw 610 engages a threaded hole (not shown) on the underside of the base having an axis perpendicular to bar 300. The low-profile electrode slides along bar 300 so that it can be conveniently positioned under a roller and is held in place by screw 610 which, when tightened, frictionally engages bar 300 to prevent the base from sliding along the bar. The portion of the low-profile conductor which contacts the horizontal bar is covered with an insulating coating (not shown) to Prevent electrical contact between the conductor and the bar.

In view of the above, it will be seen that the several objects of the invention are achieved and other advantageous results attained.

As various changes could be made in the above constructions and methods without departing from the scope of the invention, it is intended that all matter contained in the above description or shown in the accompanying drawing shall be interpreted as illustrative and not in a limiting sense.

What is claimed is:

1. An apparatus for controlling the moisture content of an endless moving belt comprising:
    means for electrically conducting a signal;
    means having a surface for providing electrical contact between the means for conducting and the belt, the means for providing being rotatable relative to the means for conducting;
    means connected to the conducting means for detecting the belt resistance and providing a resistance signal having a magnitude representative of the belt resistance;
    means for comparing a magnitude of the resistance signal to a magnitude of a preset reference signal and providing an activating signal when the resistance signal is greater than the reference signal; and
    means responsive to the indicating means for increasing the moisture level of the belt when the moisture level falls below the predetermined minimum.

2. An apparatus as recited in claim 1, in whch the providing means comprises:
    a first rotatable element located between the conducting means and the belt and adapted to carry moisture on its surface to provide electrical contact between the conducting means and the belt.

3. An apparatus as recited in claim 2, in which the conducting means comprises:
    a first conductor; and
    means for urging the conductor against the first rotatable element.

4. An apparatus as recited in claim 3, in which the urging means comprises:
    a stationary member which forces the conductor toward the first rotatable element.

5. An apparatus as recited in claim 4, in which the conductor comprises:
    a resilient conductive member having a free end adapted to contact the rotatable element;
    a base supporting said conductive member and adapted to engage said stationary member, said base adapted to bias said conductive member toward the rotatable element so that the free end contacts the rotatable element.

6. An apparatus as recited in claim 5, in which the resilient conductive member comprises:
    a spring steel member, the free end having a contact tip adapted to contact the first rotatable element.

7. An apparatus as recited in claim 6, in which the rotatable element comprises:
    a ceramic roller adapted to support the belt.

8. An apparatus as recited in claim 7, in which the indicating means comprises:

means for detecting the belt resistance and providing a resistance signal having a magnitude representative of the belt resistance;

means for comparing a magnitude of the resistance signal to a magnitude of a preset reference signal and providing an activating signal when the resistance signal magnitude is greater than the reference signal magnitude.

9. An apparatus as recited in claim 8, in which the means for increasing the moisture level of the belt comprises:

means responsive to the activating signal for spraying the belt with water.

10. An apparatus as recited in claim 9, in which the means for spraying comprises:

a pressurized water supply;

a nozzle adapted to spray water on the belt; and a solenoid valve adapted to connect the nozzle to the water supply in response to the activating signal.

11. An apparatus as recited in claim 10, in which the belt is grounded and wherein said means for detecting the belt resistance comprises a voltage source adapted to apply a potential difference to the first conductor and wherein said means for comparing comprises a comparator adapted to compare the potential difference applied to the first conductor to a reference voltage and adapted to provide an activating signal when the potential difference is greater than the reference voltage.

12. An apparatus as recited in claim 11, further comprising a second grounded conductor in electrical contact with the belt.

13. An apparatus as recited in claim 12 further comprising a second rotatable element located between and in electrical contact with the second conductor and the belt, the second rotatable element being rotatable relative to the second conductor and adapted to support the belt as it moves.

14. An apparatus as recited in claim 3, in which the conductor comprises:

a resilient conductive material in a generally U-shape having first and second legs joined by a base;

a free end of the first leg contacting the first rotatable conductive element; and a free end of the second leg abutting against a stationary member and biased toward the first leg thereby forcing the free end of the first leg against the first rotatable conductive element.

15. An apparatus as recited in claim 3, in which the conductor comprises:

a resilient conductive member having a free end adapted to contact the rotatable element;

a base supporting said conductive member and adapted to engage a stationary member, said base adapted to bias said conductive member toward the rotatable element so that the free end contacts the rotatable element.

16. An apparatus as recited in claim 1, in which the means for increasing the moisture level of the belt comprises means responsive to the activating signal for spraying the belt with water.

17. An apparatus for controlling the moisture content of an endless moving belt, said apparatus comprising:

a conductor;

a support roller having a surface in contact with the belt and the conductor adapted to carry moisture on the surface to provide electrical contact between the belt and the conductor;

a belt resistance detector connected to the conductor;

means responsive to the belt resistance detector for generating a belt resistance signal corresponding in magnitude to the detected belt resistance;

a reference resistance signal generator;

means for comparing the magnitude of the belt resistance signal with the reference signal; and means responsive to the comparing means for activating a spray system adapted to spray water on the belt when the belt resistance signal is greater than the reference signal.

18. An apparatus as recited in claim 17 further comprising a support structure adapted to support the conductor and the spray system.

19. An apparatus as recited in claim 18, in which the conductor comprises:

a resilient conductive member having a free end adapted to contact the rotatable element;

said support structure including a base supporting said conductive member and adapted to engage a stationary member, said base adapted to bias said conductive member toward the rotatable element so that the free end contacts the rotatable element.

* * * * *